(12) United States Patent
Barrat et al.

(10) Patent No.: US 10,503,492 B2
(45) Date of Patent: Dec. 10, 2019

(54) LIVE KERNEL UPDATING USING PROGRESSIVE CHECKPOINTING AND NETWORK TUNNELS

(71) Applicant: INTERNATIONAL BUSINESS MACHINES CORPORATION, Armonk, NY (US)

(72) Inventors: Frederic Barrat, Toulouse (FR); Dwip N. Banerjee, Austin, TX (US); David Z. Dai, Austin, TX (US); Khalid Filali-Adib, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/813,631

(22) Filed: Nov. 15, 2017

(65) Prior Publication Data

US 2019/0146780 A1   May 16, 2019

(51) Int. Cl.
*G06F 8/656* (2018.01)
*G06F 9/48* (2006.01)
(Continued)

(52) U.S. Cl.
CPC .......... *G06F 8/656* (2018.02); *G06F 9/45558* (2013.01); *G06F 9/4868* (2013.01);
(Continued)

(58) Field of Classification Search
CPC .......... G06F 8/656; G06F 8/65; G06F 9/4868; G06F 2009/4557; G06F 2009/45575;
(Continued)

(56) References Cited

U.S. PATENT DOCUMENTS

2014/0029613 A1    1/2014  Dholakia et al.
2015/0324215 A1*  11/2015  Borthakur ........... G06F 9/45558
                                                  718/1
(Continued)

OTHER PUBLICATIONS

Kashyap et al., "Instant OS Updates via Userspace Checkpoint-and-Restart," USENIX Annual Technical Conference (USENIX ATC '16), ISBN: 978-1-931971-30-0, Jun. 22-24,2016, pp. 1-16.

*Primary Examiner* — Jacob D Dascomb
(74) *Attorney, Agent, or Firm* — Cantor Colburn LLP; Joseph Petrokaitis

(57) ABSTRACT

Technical solutions are described for performing a live update of an operating system. An example method includes cloning an original root volume group associated with an operating system instance executing in a first logical partition to generate a cloned root volume group for booting a second logical partition. The method further includes applying the update to the cloned root volume group, and booting the second logical partition. The method further includes migrating an application instance, from the original root volume group to the second logical partition. The migration includes creating a network tunnel between the first and second logical partitions, and restarting the application instance on the second logical partition. The migration further includes forwarding data directed to the application instance on the first logical partition to the application instance on the second logical partition, and assigning a network address of the first logical partition to the second logical partition.

15 Claims, 4 Drawing Sheets

(51) Int. Cl.
  *H04L 12/861* (2013.01)
  *H04L 29/08* (2006.01)
  *H04L 12/46* (2006.01)
  *G06F 9/455* (2018.01)

(52) U.S. Cl.
  CPC ...... *H04L 12/4641* (2013.01); *H04L 49/9005* (2013.01); *H04L 67/1095* (2013.01); *G06F 2009/4557* (2013.01); *G06F 2009/45575* (2013.01); *H04L 67/325* (2013.01)

(58) Field of Classification Search
  CPC ............. H04L 12/4641; H04L 49/9005; H04L 67/1095; H04L 67/325
  See application file for complete search history.

(56) References Cited

U.S. PATENT DOCUMENTS

| | | | |
|---|---|---|---|
| 2016/0020946 A1* | 1/2016 | Morper | H04L 41/0806 709/222 |
| 2016/0092203 A1* | 3/2016 | Filali-Adib | G06F 9/4856 717/171 |
| 2016/0119417 A1* | 4/2016 | Fang | H04L 67/1095 709/219 |
| 2016/0210141 A1 | 7/2016 | Gunti et al. | |
| 2016/0342403 A1* | 11/2016 | Zamir | G06F 8/61 |
| 2017/0060574 A1* | 3/2017 | Malladi | G06F 8/70 |
| 2017/0142232 A1 | 5/2017 | Banerjee et al. | |

* cited by examiner

LIVE KERNEL UPDATING USING PROGRESSIVE CHECKPOINTING AND NETWORK TUNNELS

BACKGROUND

The present invention relates to computer technology and more specifically, to live kernel updates by minimizing network blackout time using progressive checkpointing over internet protocol (IP) tunnels.

Updating or patching the kernel of an operating system of a computing system generally requires rebooting the computing system. That is, the update or patch of the kernel is installed and then the computing system is rebooted for the update or patch of the kernel to be loaded and executed on the computing system. This means that kernel fixes or updates cannot be applied to a system without restarting applications after experiencing some downtime to accomplish the rebooting operation.

SUMMARY

Embodiments of the present invention are directed to performing a live update of an operating system in a data processing system that includes a processor and a memory. According to one or more embodiments, an example method includes receiving an update to the operating system. The method further includes cloning an original root volume group associated with an operating system instance executing in a first logical partition of the data processing system to generate a cloned root volume group for booting a second logical partition of the data processing system. The method further includes applying the update to the cloned root volume group to generate an updated and cloned root volume group. The method further includes booting the second logical partition of the data processing system using the updated and cloned root volume group. The method further includes selecting an application instance, from application instances executing on the original root volume group from the first logical partition, to be migrated to the second logical partition. The method further includes migrating the application instance. The migration includes creating a network tunnel between the first logical partition and the second logical partition. The migration further includes restarting the application instance on the second logical partition. The migration further includes forwarding data directed to the application instance on the first logical partition to the application instance on the second logical partition. The migration further includes assigning a network address of the first logical partition to the second logical partition.

According to one or more embodiments a system includes a memory, and a processor coupled with the memory, the processor performing a live update of an operating system in a data processing system. The live update includes cloning an original root volume group associated with an operating system instance executing in a first logical partition of the data processing system to generate a cloned root volume group for booting a second logical partition of the data processing system. The live update further includes applying the update to the cloned root volume group to generate an updated and cloned root volume group. The live update further includes booting the second logical partition of the data processing system using the updated and cloned root volume group. The live update further includes selecting an application instance, from application instances executing on the original root volume group from the first logical partition, to be migrated to the second logical partition. The live update further includes migrating the application instance. The migration includes creating a network tunnel between the first logical partition and the second logical partition. The migration further includes restarting the application instance on the second logical partition. The migration further includes forwarding data directed to the application instance on the first logical partition to the application instance on the second logical partition. The migration further includes assigning a network address of the first logical partition to the second logical partition.

According to one or more embodiments, an example computer program product includes a computer readable storage medium having program instructions embodied therewith, the program instructions are executable by a processing circuit to cause the processing circuit to perform a live update of an operating system in a data processing system. The live update includes cloning an original root volume group associated with an operating system instance executing in a first logical partition of the data processing system to generate a cloned root volume group for booting a second logical partition of the data processing system. The live update further includes applying the update to the cloned root volume group to generate an updated and cloned root volume group. The live update further includes booting the second logical partition of the data processing system using the updated and cloned root volume group. The live update further includes selecting an application instance, from application instances executing on the original root volume group from the first logical partition, to be migrated to the second logical partition. The live update further includes migrating the application instance. The migration includes creating a network tunnel between the first logical partition and the second logical partition. The migration further includes restarting the application instance on the second logical partition. The migration further includes forwarding data directed to the application instance on the first logical partition to the application instance on the second logical partition. The migration further includes assigning a network address of the first logical partition to the second logical partition.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
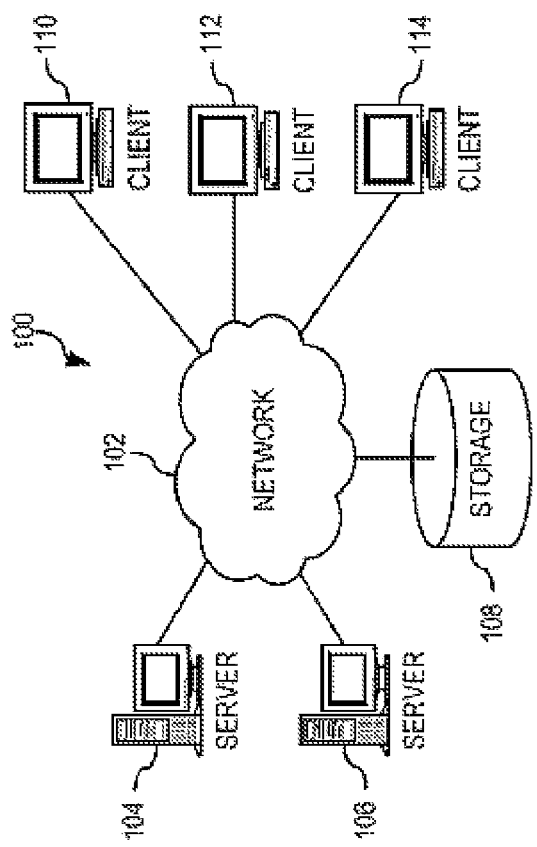
FIG. 1 depicts a pictorial representation of an example distributed data processing system according to one or more embodiments.

Typically, in order to perform an update or patch of an operating system or kernel, the computing system executing the operating system or kernel is rebooted, which causes user applications to be restarted after a period of delay corresponding to the amount of time required to reboot the computing system. Such downtime can be inconvenient and frustrating to users of such computing systems since the user's workloads may need to be restarted once the computing system is rebooted.

Moreover, while some "hot patch" capabilities have been made possible in the past, these "hot patch" capabilities are greatly limited to only certain types of kernel and kernel extension fixes. For example, changes included in the patch are to be only to program text and/or local stack variables. This means that, with "hot patch" capabilities, there cannot be any additions, deletions, rearrangement, or other modifications of data definitions, such as string definitions or the like. Moreover, this means that there cannot be any modifications to a data structure's layout including those resulting from type changes. Furthermore, this means that there cannot be any new long constants generated for which the compiler creates static entries. There are many more detailed and difficult limitations to such "hot patch" capabilities with the above being merely illustrative of some limitations of the typical "hot patch" capabilities for operating systems.

One solution to these problems, offered in the Advanced Interactive Executive (AIX®) operating system is to make use of workload partitions (WPARs) on logical partitions (LPARs). A LPAR is a subset of the computing system's hardware and software resources virtualized as a separate instance of the hardware/software such that the applications running on the LPAR have the view that they have access to all of the hardware/software of the computing system. A computing system may have multiple LPARs running, each with a separate operating system or kernel instance associated with the LPAR.

WPARs are mechanisms that permit the virtualization of an operating system or kernel within a LPAR. WPARs allow one to virtualize application workloads through operating system virtualization. Thus, WPARs are virtualized operating system environments that are created within a single AIX image, e.g., WPARs may be created within LPARs. There are essentially two types of WPARs: system WPARs, which are similar to a complete version of an operating system having its own dedicated file systems and operating system daemon processes; and application WPARs, which are a more lightweight version of virtualized operating system environments having limited capabilities and which can only run application processes, not operating system daemons.

However, the "hot patch" and WPAR based approaches to addressing the technical challenge of performing live updates or patches of an operating system or kernel have limitations and drawbacks such that they are either not applicable or not acceptable in many cases. For example, the typical solutions include creating a snapshot of a current image/state of the operating system and checkpointing the processes and related data and structures. Further, the checkpointed information is transferred to the surrogate partition, and the surrogate is restarted when it is in a position to be restarted. This however, produces a potential blackout time especially on an active system with multiple resources and processes. During the blackout, remote peers do not get to communicate with the system and this may result in dropped connections, retries, performance degradation and even disconnects. This is because the network is blocked on the original and the checkpointed state is being transferred (but not yet completed) and the surrogate cannot resume execution. Once the relevant data is transferred, the network on the surrogate is unblocked and it can start receiving data and when the program execution starts, the applications become responsive again. Thus, the typical solutions have a technical challenge of the network blackout while the checkpointed data is being transferred from the original to the surrogate.

The technical solutions described herein address the technical challenge described above by eliminating a downtime associated with the deployment of patches and/or requiring a LPAR reboot to take effect. Thus, the technical solutions facilitate patches to take effect without any downtime to the running workloads and further the workloads can take advantage of the new patches (Kernel, Kernel Extensions, and libraries). The technical solutions described herein further facilitates applying any patches in this manner, without being limited to Kernel or Kernel Extensions.

In one or more examples, the technical solutions described herein creates a surrogate partition to mirror an original partition on which the operating system is to be patched. The root volume group of the surrogate partition (surr-boot-rootvg) is a cloned image of the root volume group (orig-rootvg) of the original. The surrogate partition may be created using a utility such as alt_disk_copy in a computing system that is executing the AIX® operating system. Any other utility may be used in other examples, where the utility clones the root volume group and updates the root volume group with a received patch to update the operating system.

Further, the technical solutions facilitate moving running workloads from the original partition to the surrogate partition. In one or more examples, while a workload is running, the orig-rootvg of the original partition is mirrored into the surr-mir-rootvg. Further, when applications are checkpointed, the orig-rootvg on the original partition is split. Further yet, the mirrored copy of sur-mir-rootvg is imported on the surrogate partition, and filesystems from the sur-mir-rootvg are mounted in a chrooted environment. The workload is chrooted on the mirrored volume group when restarted. It should be noted that chroot on Unix operating systems is an operation that changes the apparent root directory for a running process and its children. In other examples running different operating systems, a different utility may be used in place of 'chroot'.

In the technical solutions described herein, when the transfer of the data from the Original to the surrogate partition is being done, the Original LPAR is removed. And the remaining resources are moved to the Surrogate Partition. The next reboot of the surrogate partition uses the mirrored volume group sur-mir-rootvg as the permanent root volume group of the surrogate partition, thus completing the application of the patch (update) to the operating system.

After the patch is completed, if for some reason, the user prefers to revert the patch, and use the environment prior to the update operation (i.e. rollback), the technical solutions described herein facilitate the rollback by using the disks hosting orig-rootvg.

The technical solutions described herein facilitate updating the operating system using existing the standard tools in the operating system, such as the tool geninstall that deploys patches and update packages in AIX®. Thus, the technical solutions described herein address the technical challenges described earlier.

Figure 2:
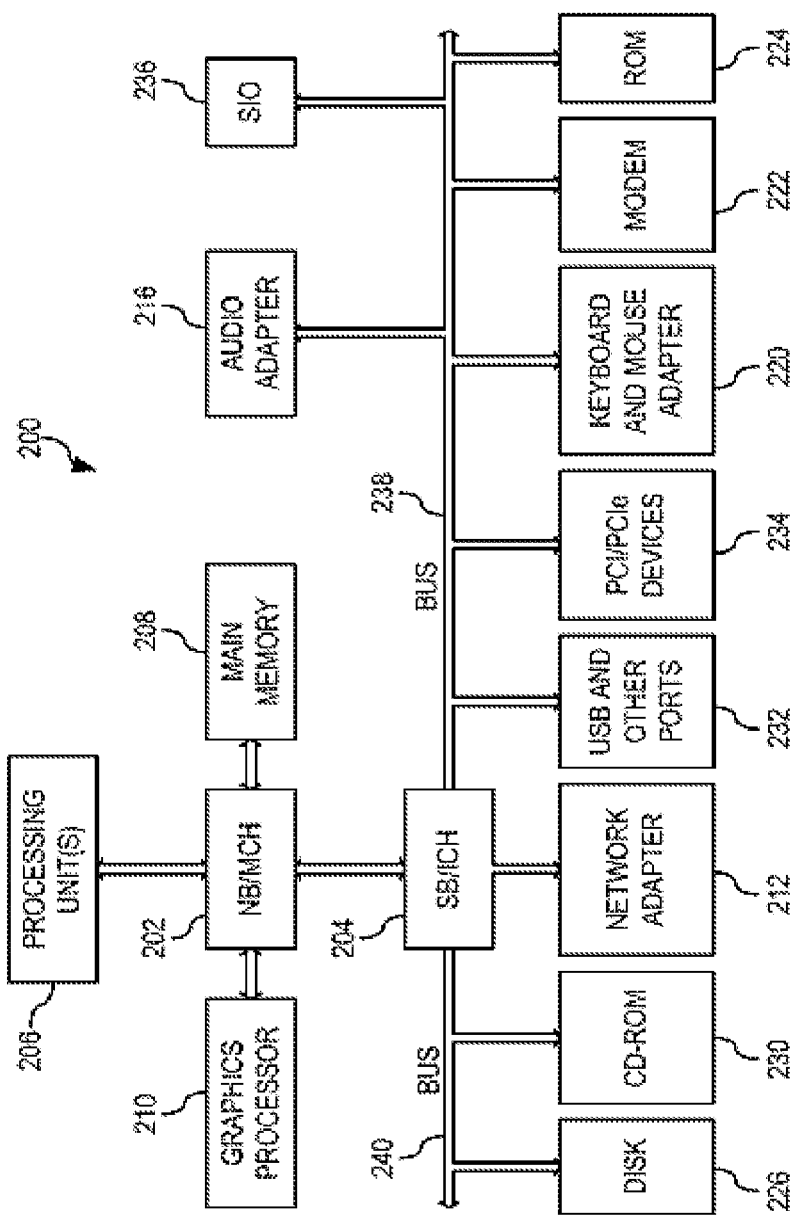
FIG. 2 is a block diagram of an example data processing system according to one or more embodiments.

It should be noted that the illustrative embodiments of the technical solutions described herein may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north-bridge and memory controller hub (NB/MCH) 202 and south-bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®, or the like. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

In accordance with the illustrative embodiments, one or more of the computing devices in FIG. 1, e.g., servers 104, 106, client computing devices 110-114, or the like, may implement a logically partitioned environment in which the particular computing device hosts one or more logical partitions (LPARs). These logical partitions each comprise an instance of an operating system, such as the AIX® operating system, which is used to run user space applications in a virtualized environment such that the user space applications appear to have access to all of the resources of the computing device hosting the LPAR in which it executes.

Periodically, the operating system running in one or more LPARs may need to be updated or patched. Such updates or patches may be electronically distributed to the various computing devices of the network 102 in FIG. 1 automatically, or the update may be manually initiated by a system administrator or the like. For example, an operating system may periodically poll a computing device associated with a provider of the operating system to determine if there is an update or patch available for the operating system. If so, the update or patch may be downloaded from the providers' computing device to the computing device executing an operating system that needs to be updated/patched.

The technical solutions described herein facilitate update patches to take effect without any downtime to the running workloads and further the workloads can take advantage of the new patches (Kernel, Kernel Extensions and libraries). The technical solutions described herein further facilitates applying any patches in this manner, without being limited to Kernel or Kernel Extensions.

For example, according to illustrative embodiments of the technical solutions described herein, a clone of the root volume group (rootvg) of an operating system instance of a LPAR is generated and updated by the update to the operating system and then used to boot a new LPAR. Once the new LPAR is up and running, application instances running in the original LPAR are migrated to the new LPAR. The actual movement of the application instances involves checkpointing the application instances on the old LPAR and passing this state information to the new LPAR where application instances are started on the new LPAR and initialized with the checkpointed state. In one or more examples, the migration is performed in a progressive an iterative manner using network tunnels. Once migrated, the application instances are immediately available to user processes. The application data is then asynchronously copied from the memory associated with the original LPAR to memory associated with the new LPAR. Once the application and its associated data are moved over to the new LPAR, then the original LPAR and its resources may be freed for reuse. The new LPAR assumes the identity of the original LPAR so that from an external perspective there is no indication that the switch between the original LPAR and the new LPAR has occurred. Further, the technical solutions improve the migration further, by eliminating the network activity being blocked during the migration, by progressively reactivating applications that are migrated to the new LPAR and forwarding network data from the original LPAR to the new LPAR using the network tunnels. Once an application instance is reactivated on the new LPAR with the checkpointed state, the application instance can continue communicating with the client systems at the same point where they left off prior to the migration.

Thus, while the update of the operating system is being performed, user space processes and users themselves may interact with the application instances executing in the original LPAR. When the update of the operating system is complete, the new LPAR stands in for the old LPAR, however the new LPAR has the update applied to the operating system via the update being performed on the cloned copy of the root volume group from the old LPAR, where the root volume group comprises the operating system image, shared libraries, OS commands, user definitions, device configuration database, and the like. Thus, a seamless live update of the operating system is made possible without having to restart workloads or otherwise significantly disrupt already executing applications and workloads. Moreover, updates to user-space binaries, including shared libraries and the like, may be performed using the mechanisms of the illustrative embodiments.

Figure 3:
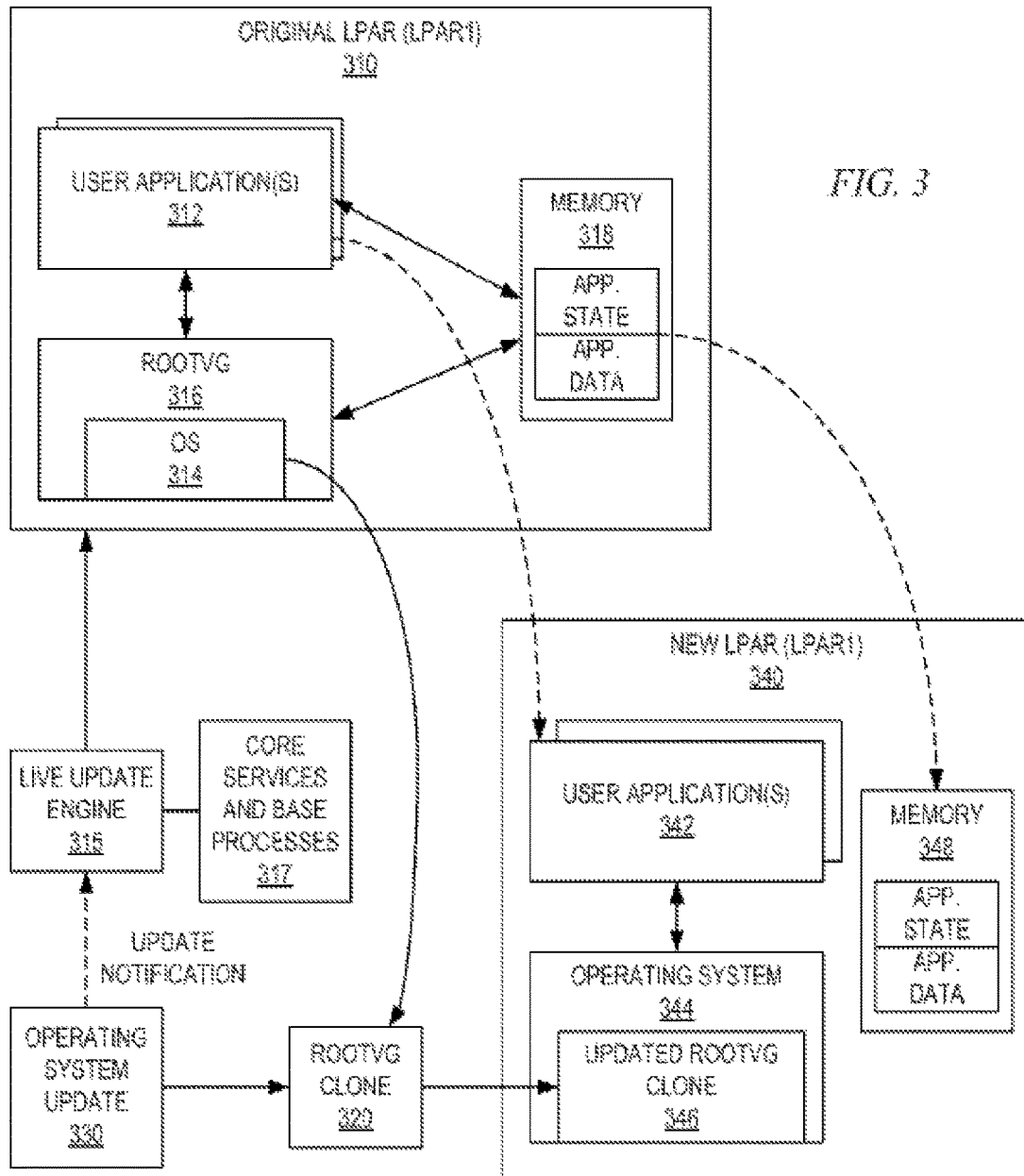
FIG. 3 illustrates an example update/patch operation for performing a live update of an operating system in accordance with one or more illustrative embodiments.

FIG. 3 illustrates an example update/patch operation for performing a live update of an operating system in accordance with one or more illustrative embodiments. The elements shown in FIG. 3 may be implemented within a computing device implementing virtualized environments including one or more logical partitions. This computing device, in one illustrative embodiment, is a server computing device in which multiple logical partitions are implemented, e.g., one for each client computing device accessing the server computing device. It should be noted that, this is only an example and any implementation in which the illustrative embodiments are used to update or patch an operating system instance in a logical partition of computing device resources is considered within the spirit and scope of the illustrative embodiments.

As shown in FIG. 3, initially a logical partition, i.e. the original logical partition (LPAR1) 310, is running in the computing device 300. An operating system instance 314 is executed within LPAR1 310 having a root volume group (rootvg) 316. User space applications 312 are executed within LPAR1 via the operating system instance 314. The applications 312 have application state data and application data stored in memory 318. The application state data specifies the execution state and control structures associated with the execution of the applications 312. The application data is the data upon which the applications 312 operate to perform their functions.

The computing device 300 further includes a live update engine 315 and core services and base processes listing data structure 317. The live update engine 315 includes orchestrates and performs operations to facilitate the live update of the operating systems 314 in logical partitions hosted by the computing device 300. The core services and base processes listing data structure 317 lists the core services and base processes that cannot be migrated to the new logical partition (LPAR2) 340 when performing the live update of the operating system 314 and must be maintained in the original LPAR1 310 while the live update operation is being performed.

It should be appreciated that while the live update engine 315 is shown in FIG. 3 as a separate engine from the original LPAR 310 and new LPAR 340, the live update engine may in fact be split across the LPARs 310 and 340 such that a live update command may be initiated in the original LPAR 310 to begin the live update operation and the processes of the live update may be migrated over to the new LPAR 340 along with application instances 342. The live update command may start two additional processes, one is a base process that stays behind on the original LPAR 310 and a second that is started from the initialization table on the new LPAR 340 to manage the receiving end of the migration operation. However, for simplicity of the depiction in FIG. 3, the live update engine 315 is shown as a separate entity from the original LPAR 310 and new LPAR 340 and will be described as such hereafter for ease of explanation.

As shown in FIG. 3, an operating system update or patch 330 may be received in the computing device 300 for updating/patching the operating system instances 314 running in the logical partitions hosted by the computing device 300. As mentioned above, this operating system update/patch 330 may be pulled down from a source computing device by the computing device 300, e.g., downloaded from an operating system provider computing device in response to a polling for updates by the computing device 300. Alternatively, the operating system update/patch 330 may be pushed to the computing device 300, such as in a case where computing devices implementing an operating system are registered with the provider of the operating system and the provider pushes updates/patches to the registered computing devices. The operating system update/patch 330 is a portion of code to replace or augment the operating system 314 and must be installed in the logical partition 310 for updating/patching the logic executed as part of the operating system 314.

Further, the live update engine 315 is instructed to update/patch an operating system type, e.g., AIX, Linux, or the like (there may be different operating systems executing in different LPARs on the same computing device 300), in response to receiving the operating system update/patch 330 (hereafter referred to simply as the operating system update 330). In response, the live update engine 315 identifies the logical partitions executing instances of the operating system type to be updated/patched. The live update engine 315 further initiates and orchestrates the live update of the operating system instances in the identified LPARs in the manner described hereafter. For purposes of illustration, it will be assumed that the computing device 300 currently is hosting a single LPAR, i.e. LPAR1 310, which is executing an instance of the operating system that is to be updated/patched by the operating system update 330.

To initiate the live update operation, the live update engine 315 generates a clone, or copy, of the root volume group (rootvg) 316, including the operating system 314 that is to be updated/patched, in another storage location, e.g., another location on a same or different hard disk drive, flash memory, solid state memory device, or the like. The resulting rootvg clone 320 contains the operating system kernel, user space binaries (e.g., shared libraries), and the like, which are updated/patched using the received operating system update 330. This results in an updated/patched rootvg clone 346 which is used to boot a new logical partition (LPAR2) 340. The updated operating system logic in the updated rootvg clone 346 is executed in the new logical partition (LPAR2) 340 to boot LPAR2 340 to an up and running state so that it may be used to execute user applications.

The core services and base processes data structure 317 sets forth a list defining the services and processes that cannot be migrated from the operating system 314 to the operating system 344 as part of the operating system update/patch operation. All other services and processes of the operating system 314 may be migrated to the operating system 344.

As mentioned above, in one or more examples, not all process can be migrated to the operating system 344 of the new LPAR2 340 until the original LPAR1 310 continues to run after the new LPAR2 340 is up and running and while the migration of the application instances 312 and restarting of the application instances 312 in the new LPAR2 340 is being performed. This is because the application data in the memory 318 associated with the moved application instance 312 processes is transferred asynchronously after the application instance 312 processes are restarted on the new LPAR2 340 such that the original LPAR1 310 must be functional until all the application data in the memory 318 has been moved to the memory 348 associated with the new LPAR2 340. Thus, there is a set of core operating system services that will not be moved and will continue to run on the original LPAR1 310. Because this set is small, the core services and base processes data structure 317 stores the list identifying which binaries should be treated as core or "base" processes. The operating system kernel of the operating system 314 may keep this listing data structure or it may be associated with the live update engine 315 as shown. The operating system kernel and/or live update engine 315 may provide an interface whereby a user may edit the list of core services and base processes, e.g., adding additional services/processes to be considered core or base processes so that they are not migrated when the operating system is updated.

The particular core and base processes that are part of the listing in the core and base process data structure 317 follow defined rules specifying the relationship between these core and base processes and processes that may be moved from the original LPAR1 310 to the new LPAR2 340. First, the base processes will all run as children of the initialization process or children of other base processes. Second, all the children of base processes are also considered base processes. Third, base processes do not share resources with non-base processes.

Services and processes that are not part of the listing data structure 317 are considered migratable. The new LPAR2 340 is booted with a minimum set of services, present as part of the new copy of the operating system on LAPR2 340, which start running on the new LPAR2 340 to enable it to boot up and receive workloads being moved from the original LPAR1 310. The services used to boot the new LPAR2 340 may be specified in a customized initialization table associated with the operating system instance 314 and may be stored in the rootvg 316 that is cloned and updated to enable the booting up of the new LPAR2 340.

Once LPAR2 340 is up and running, the application instances 312 are migrated to the new LPAR 340 as application instances 342. The migration is done progressively, in an incremental manner, one application instance at a time. For example, instead of checkpointing the whole system in LPAR1 310, transferring the data for all the application instances 312 together, and then restarting the new LPAR2 340, the checkpointing is performed on a process by process basis (for the non-base i.e. checkpointable processes) and in an incremental manner in the LPAR1 310. During the migration, one or more IP filters are used to direct network traffic for an application instance that has been migrated from LPAR1 310 to the LPAR2. For example, network tunnel is created for the network traffic to be directed to a migrated application instance on the new LPAR2 340. In addition, sockets and buffers associated with the application instance are moved to the LPAR2 340 and the network tunnel facilitates the network traffic to be directed to these data structures on LPAR2, once the migrated application instance on the LPAR2 is executing.

In addition, the progressive and incremental migration facilitates migrating the application instance from the LPAR1 310 to the LPAR2 340 in an incremental manner to further reduce any disruption of service by the application instance. Such an incremental migration uses a live-kernel update (LKU) transfer table (LTT) to map an application instance from LPAR1 310 to a corresponding migrated application instance on the LPAR2 340. For example, an entry in the LTT maps a port associated with the application instance in the LPAR1 310 to a port associated with the corresponding migrated application instance on LPAR2 340.

The application instances 342 will then continue execution from their previous state but on the new LPAR2 340 as application instances 342. The application data from the memory 318 is transferred to the memory 348 associated with the new LPAR2 340 in an asynchronous manner.

After all applications and associated resources have been transferred over to the new LPAR2 340, the original LPAR 310 is deactivated and its resources are freed up for reuse. The new LPAR2 340 assumes the identity of the original LPAR1 310 by configuring the network connections of LPAR2 340 with the same hostname and network address, e.g., IP address that was used by LPAR1 310 such that any subsequent contacts from client systems on the network will be routed to the new LPAR2 340 and its application instances.

Such a progressive and incremental migration of the application instances 312 avoids a blackout time during the move of the application instances 312 to the new LPAR2 340. Thus, unresponsiveness of the application instances 312 is avoided, because during the blackout time, the application instances 312 are not responsive as the processes of the application instances are checkpointed, moved, and restored on the new LPAR 340.

Thus, from the viewpoint of an external process or user, there is no indication that there has been a switch over from the original LPAR1 310 to the new LPAR2 340. Hence, the application instances 312 continue to run on what appears to be the same LPAR1 310 when in fact the application instances 312 are new application instances 342 in a new LPAR2 340 executing at a same checkpointed state and using the same application data as was present in the original LPAR1 310 prior to the update. From a user perspective, other than the brief blackout period, there appears to be no change to the system other than the update/patch has been applied. This preserves the application instances and workloads running on the original LPAR1 310. Active applications continue running with the same shared libraries that they were using previously on the original LPAR1 310. Any new binaries that are executed will use the new updated shared libraries.

Figure 4:
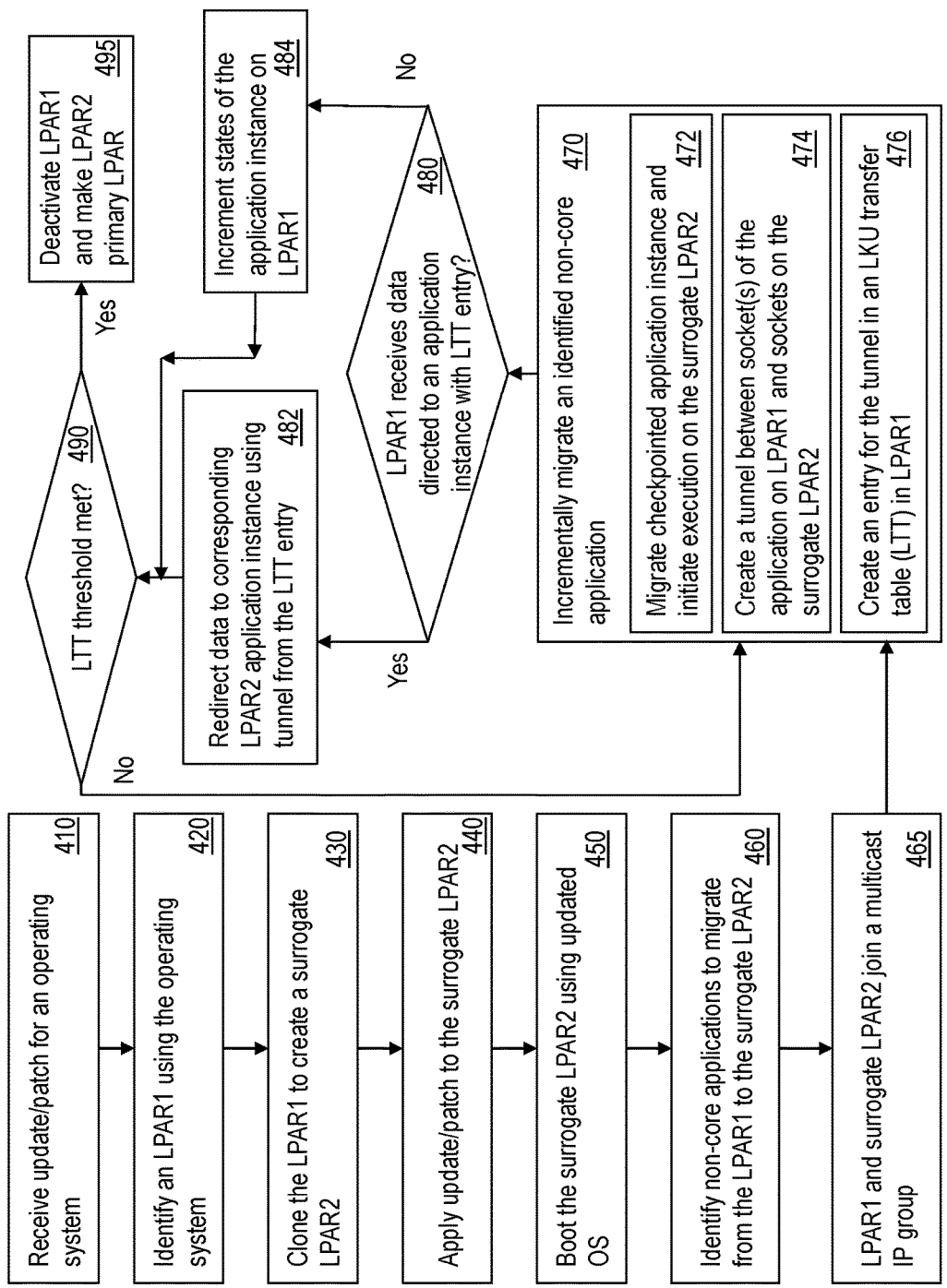
FIG. 4 is a flowchart outlining an example operation for performing a live update of an operating system in accordance with one illustrative embodiment.

FIG. 4 is a flowchart outlining an example operation for performing a live update of an operating system in accordance with one illustrative embodiment. The method is initiated by receiving the update 330 to be applied to the operating system 344, as shown at 410. The LPAR1 310 implementing the operating system 344 to be updated is identified, as shown at 420 and the root volume group of the operating system 344 executing in this original LPAR1 310 is cloned, as shown at 430. The update is applied to the cloned root volume group to generate an updated cloned volume group, as shown at 440. The updated cloned volume group is used to boot the new surrogate LPAR2 340, as shown at 450.

Once the surrogate LPAR2 340 is booted, non-core or base processes or application instances in the original LPAR1 310 are identified for migration to the surrogate LPAR2 340 partition, as shown at 460. Identifying the non-core application instances includes identifying the relevant support structures of the application instances for incrementally transferring the application instances to the surrogate LPAR2 3409.

Before the incremental migration process starts, the original LPAR1 310 and the surrogate LPAR2 340, both, join a specific multicast group (<multicast_ip>), as shown at 465. In one or more examples, the multicast group may be an all-host group with, all the hosts in the multicast group receiving messages (described below).

Further, the method includes incrementally migrating each identified non-core application instance from the original LPAR1 310 to the surrogate LPAR2 340, as shown at 470. The incremental migration includes migrating a checkpointed application instance and initiating execution of the application instance on the surrogate LPAR2 340, as shown at 472. Migrating the checkpointed application includes transferring application state and data for the application instance from the memory 318 to the memory 348. In one or more examples, the transfer is performed asynchronously. It should be noted that the application instance in the original LPAR1 310 is still kept active at this time, and is responsible for responding to any client requests.

In one or more examples, the application instance selected to be transferred from the multiple non-base application instances on the LPAR1 310 is based on a priority value assigned to the application instances for migration purposes. For example, the migration priority value may be based on a quality of service (QoS) agreement for the application instance, the QoS value indicative of a threshold service downtime allowable for the application instance. It should be noted that the migration priority value may be based on other factors in other examples.

The incremental migration further includes creating a tunnel between socket(s) of the application instance on LPAR1 310 and sockets of the application instance on the surrogate LPAR2 340, as shown at 474. For example, the open sockets are moved to the surrogate by moving the socket and the corresponding buffers, along with protocol control blocks (PCB) and other accompanying data structures for the sockets. Further, an entry for the tunnel is created in the LKU transfer table (LTT) in LPAR1 310, as shown at 476. In the LTT entry the corresponding port on the original LPAR1 310 is marked as "transferred" for the IP address of the application instance to the surrogate LPAR2 340. The LTT entry thus maps the <port, IP> from the original LPAR1 310 to a <port, multicast_ip> on the surrogate LPAR2 340. Once the tunnel is created, the application instance on the original LPAR1 310 is closed, and the application instance on the surrogate LPAR2 340 is responsible for responding to client requests.

Any client data, including a client request, received at the LPAR1 310 is checked to determine if the data is directed to an application instance with a corresponding LTT entry, as shown at 480. If the data is addressed to the socket on the original LPAR1 310 for the application instance that has also been transferred to the LPAR2 340, the data redirected to the socket (of the application instance) on the surrogate LPAR2 340 by forwarding the data to the multicast group, as shown at 482.

Thus, the LTT entry maps the tunnel from the original LPAR1 310 to the surrogate LPAR2 340 for the application instance. It should be noted that other examples use other ways to transfer the data from the original LPAR1 310 to the surrogate LPAR2, instead of using the multicast. For example, private IPs may be used between the original LPAR1 310 and the surrogate LPAR2 340. In this case, when the surrogate LPAR2 340 receives the forwarded data packet from the original LPAR1, the surrogate LPAR2 extracts the packet to recover the original packet addressed to <port, IP> and forwards the data packet to the application instance that is now executing on the surrogate LPAR2. Because the application instance along with the supporting structures has already been moved to the surrogate LPAR2 340, the LPAR2 340 locates the socket and protocol control blocks based on the inner header of the extracted & forwarded packet, and delivers the contents to the application instance.

Further, in case the data is not directed to the application instance that has a corresponding LTT entry, or in other words is directed to an application instance that does not have a corresponding LTT entry, the application instance on the LPAR1 310 responds to the data, and the application state on the LPAR1 310 is updated accordingly, as shown at 484. Further, the progressive checkpointed migration includes determining if an LTT threshold has been met, as shown at 490. In one or more examples, the threshold value is a configurable value, which includes a predetermined number of entries in the LTT. For example, the predetermined threshold is a total number of non-base application instances executed on the LPAR1 310.

If the threshold has not been met, a next application instance from the original LPAR1 310 is selected to be migrated to the surrogate LPAR2 320, as shown at 470, and as described herein. In one or more examples, the next application instance selected for the migration is a process or application that the previously migrated application instance depends on. For example, if the previous application instance uses the next application instance, for example via an application programming interface (API) or the like, the original LPAR1 310 selects the next application instance for migrating to the surrogate LPAR2 340. In one or more examples, the operating system of original LPAR1 310 maintains a list of dependency for the application instances executing on the LPAR1 310.

Thus the LTT continues to grow on the original LPAR1 310 as more and more application instances are migrated to the surrogate LPAR2 340 and restarted. Once the predetermined threshold value, when the "transferred" entries reach a configurable limit, the surrogate LPAR2 340 takes over as the primary, by taking over the IP of the original LPAR1 310 and starts receiving the data packets from the clients directly, without the tunneling based forwarding any more, as shown at 495. At that point the packets from the clients are directly routed to the surrogate LPAR2 340. Both, the original LPAR1 310 and the surrogate LPAR2 340 are removed from the multicast group, and the LPAR1 310 is shut down, completing the migration and the update of the operating system.

In one or more examples, to minimize the process freeze times during migration of application states, the system 100 may employ a pre-copy to move the states of the application instances from the original LPAR1 310 to the surrogate LPAR2 340. Here, the application states and the accompanying data structures are copied to the surrogate LPAR2 340 initially, prior to initiating the migration of the application instances to the surrogate LPAR2 340, for example as an initial snapshot of the memory 318. Over time as data arrives/leaves based on client requests/application instance execution, the application state changes. Such incremental changes to an application state for an application instance are communicated to the surrogate LPAR2 340, while the original LPAR1 310 is still executing the application instance, and thus handling client request (no LTT entry).

In one or more examples, when a rate of change in the application state reaches below a certain pre-specified threshold, the LPAR1 310 stops the application instance and initiates the migration of the application instance to the surrogate LPAR2 340, by creating the LTT forwarding entry. Alternatively, or in addition, the LTT entry is activated for the application instance at this time, the LTT entry having been created earlier. Further yet, in addition to creating/activating the LTT entry, the original LPAR1 310 also sends to the surrogate LPAR2 340, the last application state increment for the surrogate LPAR2 340 to take over the application instance execution. The application instance now executes on the surrogate LPAR2 340 getting the forwarded data from the original LPAR1 310 as described herein. The application instance on the surrogate LPAR2 340 can respond directly to the client requests spoofing the original LPAR1's 310 public IP address (which is not yet under the surrogate LPAR2's 340 control).

As described before, such an incremental transfer can be subject to dependencies and the aforesaid method is applied recursively beforehand to other application instances that the application instance being migrated is dependent on. Such a pre-copy method of progressive checkpointing facilitates almost zero downtime for an application instance and a minimal overall blackout time for the whole system when updating the operating system using the technical solutions for live update described herein.

The technical solutions described herein thus facilitate updating the operating system with a minimal disruption of service for the application instances. The technical solutions minimize the network blackout by creating network tunnels to facilitate application instances on a surrogate LPAR to respond to client requests while each of the non-base application instances on the original LPAR are migrated to the surrogate LPAR. Further, the technical solutions facilitate migrating each application instance to the surrogate LPAR using a fine-grain progressive checkpointing to further minimize disruption for the application instance when being migrated.

The technical solutions described herein thus improve existing computer technology, specifically updating operating systems without having to restart the operating system or freezing services provided by applications executing on the operating system.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing a live update of an operating system in a data processing system comprising a processor and a memory, the method comprising:
   receiving an update to the operating system;
   cloning an original root volume group associated with an operating system instance executing in a first logical partition of the data processing system to generate a cloned root volume group for booting a second logical partition of the data processing system;
   applying the update to the cloned root volume group to generate an updated and cloned root volume group;
   booting the second logical partition of the data processing system using the updated and cloned root volume group;
   selecting an application instance, from a plurality of application instances executing on the original root volume group from the first logical partition, to be migrated to the second logical partition;
   migrating the application instance, the migration comprising:
      creating a network tunnel between the first logical partition and the second logical partition;
      creating an entry in a live-kernel update transfer table (LTT) mapping the network tunnel;
      restarting the application instance on the second logical partition;
      forwarding data directed to the application instance on the first logical partition to the application instance on the second logical partition; and
      assigning a network address of the first logical partition to the second logical partition in response to a number of entries in the LTT exceeding a predetermined threshold.

2. The computer-implemented method of claim 1, wherein the network tunnel maps a first port associated with the application instance on the first logical partition and the network address of the first logical partition with a second port associated with the application instance on the second logical partition and a network address of the second logical partition.

3. The computer-implemented method of claim 1, wherein the application instance is a first application instance, and the method further comprises:
   in response to receiving data directed to a second application instance on the first logical partition, forwarding the received data to the second application instance on the first logical partition.

4. The computer-implemented method of claim 1, wherein the migration further comprises:
   copying an application state of the application instance to the second logical partition prior to creating the network tunnel; and
   creating the network tunnel mapping the application instance from the first logical partition to the application instance from the second logical partition further comprises forwarding incremental changes to the application state to the second logical partition.

5. The computer-implemented method of claim 1, wherein the application instance is selected for migration based on a priority value assigned to the application instance.

6. The computer-implemented method of claim 5, wherein the priority value is assigned to the application instance based on a quality of service (Qos) agreement associated with the application instance.

7. The computer-implemented method of claim 1, wherein the application instance is selected for migration based on a dependency of another application instance on the application instance.

8. A system comprising:
   a memory; and
   a processor coupled with the memory, the processor configured to perform a live update of an operating system in a data processing system, the live update comprising:
      receiving an update to the operating system;
      cloning an original root volume group associated with an operating system instance executing in a first logical partition of the data processing system to generate a cloned root volume group for booting a second logical partition of the data processing system;
      applying the update to the cloned root volume group to generate an updated and cloned root volume group;
      booting the second logical partition of the data processing system using the updated and cloned root volume group;
      selecting an application instance, from a plurality of application instances executing on the original root volume group from the first logical partition, to be migrated to the second logical partition;
      migrating the application instance, the migration comprising:
         creating a network tunnel between the first logical partition and the second logical partition;

creating an entry in a live-kernel update transfer table (LTT) mapping the network tunnel;
restarting the application instance on the second logical partition;
forwarding data directed to the application instance on the first logical partition to the application instance on the second logical partition; and
assigning a network address of the first logical partition to the second logical partition in response to a number of entries in the LTT exceeding a predetermined threshold.

9. The system of claim 8, wherein the network tunnel maps a first port associated with the application instance on the first logical partition and the network address of the first logical partition with a second port associated with the application instance on the second logical partition and a network address of the second logical partition.

10. The system of claim 8, wherein the live update further comprises:
copying an application state of the application instance to the second logical partition prior to creating the network tunnel; and
creating the network tunnel mapping the application instance from the first logical partition to the application instance from the second logical partition further comprises forwarding incremental changes to the application state to the second logical partition.

11. The system of claim 8, wherein the application instance is selected for migration based on a priority value assigned to the application instance.

12. The system of claim 8, wherein the application instance is selected for migration based on a dependency of another application instance on the application instance.

13. A computer program product comprising a computer readable storage medium having program instructions embodied therewith, the program instructions executable by a processing circuit to cause the processing circuit to perform a live update of an operating system in a data processing system, the live update comprising:
receiving an update to the operating system;
cloning an original root volume group associated with an operating system instance executing in a first logical partition of the data processing system to generate a cloned root volume group for booting a second logical partition of the data processing system;
applying the update to the cloned root volume group to generate an updated and cloned root volume group;
booting the second logical partition of the data processing system using the updated and cloned root volume group;
selecting an application instance, from a plurality of application instances executing on the original root volume group from the first logical partition, to be migrated to the second logical partition;
migrating the application instance, the migration comprising:
creating a network tunnel between the first logical partition and the second logical partition;
restarting the application instance on the second logical partition; and
forwarding data directed to the application instance on the first logical partition to the application instance on the second logical partition;
assigning a network address of the first logical partition to the second logical partition; and
creating an entry in a live-kernel update transfer table (LTT) mapping the network tunnel, and wherein the network address of the first logical partition is assigned to the second logical partition in response to a number of entries in the LTT exceeding a predetermined threshold.

14. The computer program product of claim 13, wherein the network tunnel maps a first port associated with the application instance on the first logical partition and the network address of the first logical partition with a second port associated with the application instance on the second logical partition and a network address of the second logical partition.

15. The computer program product of claim 13, wherein the live update further comprises:
copying an application state of the application instance to the second logical partition prior to creating the network tunnel; and
creating the network tunnel mapping the application instance from the first logical partition to the application instance from the second logical partition further comprises forwarding incremental changes to the application state to the second logical partition.

* * * * *